United States Patent [19]

Blubaugh et al.

[11] Patent Number: 5,194,517
[45] Date of Patent: Mar. 16, 1993

[54] CAPPED POLYPHENYLENE ETHER FOR HIGH IMPACT BLENDS AND METHOD OF PREPARATION

[75] Inventors: James C. Blubaugh, Albany; Sterling B. Brown, Schenectady; Patrick R. Dudley, Clifton Park; John B. Yates, III, Glenmont, all of N.Y.

[73] Assignee: General Electric Company, Pittsfield, Mass.

[21] Appl. No.: 634,578

[22] Filed: Dec. 27, 1990

[51] Int. Cl.$^5$ .................. C08L 71/12; C08F 6/08
[52] U.S. Cl. ...................... 525/396; 525/905; 528/496; 528/499
[58] Field of Search ............. 525/396, 905; 528/496, 528/499

[56]  References Cited

U.S. PATENT DOCUMENTS 4,110,311  8/1978  Cooper et al. .................. 528/496
4,237,265 12/1980  Eliassen et al. ................. 528/496
4,732,937  3/1988  Sybert ............................ 252/92
4,895,945  1/1990  Brown et al. ................... 544/218
5,041,504  8/1991  Brown et al. ................... 525/396

FOREIGN PATENT DOCUMENTS 0347539 12/1989  European Pat. Off. ......... 525/396

Primary Examiner—Carman J. Seccuro, Jr.
Assistant Examiner—Thomas Hamilton, III
Attorney, Agent, or Firm—Andrew C. Hess

[57]  ABSTRACT

Capped polyphenylene ethers are prepared by reaction of a polyphenylene ether with epoxy materials in methods which result in low levels of alkali metal ions and ammonium ions in the resulting product. Such low alkali metal ion and ammonium ion capped polyphenylene ethers are particularly useful in forming high impact blends with polyesters and polyamides, which find utility as molding compositions.

4 Claims, No Drawings

CAPPED POLYPHENYLENE ETHER FOR HIGH IMPACT BLENDS AND METHOD OF PREPARATION

FIELD OF THE INVENTION

This invention relates to the preparation of polyphenylene ethers which are capped, i.e. functionalized, and to the use of such capped polyphenylene ethers in the preparation of high impact polyester containing and polyamide containing compositions.

BACKGROUND OF THE INVENTION

Polyphenylene ethers have long been known as a widely used class of thermoplastic engineering resins characterized by excellent hydrolytic stability, dimensional stability, toughness, heat resistance and dielectric properties. Such polyphenylene ethers can be capped with epoxy materials, as for example, epoxy triazine. The capping procedures can result in products having higher workability, solvent resistance, and in some cases, improved other properties. Such capped polyphenylene ethers have been blended with modifying materials or used as modifying materials, as for example, with polyesters and with polyamides, to improve properties.

U.S. patent application Ser. No. 07/351,903, filed May 15, 1989, now U.S. Pat. No. 5,089,566 (corresponding to European Patent Application 347,828 published Dec. 27, 1989), describes advantageous polyphenylene ether/polyester co-polymers obtained from epoxytriazine capped polyphenylene ethers. U.S. patent application Ser. No. 07/351,905, filed May 15, 1989, now U.S. Pat. No. 5,096,979 corresponding to European Patent Application 347,827, published Dec. 27, 1989, describes epoxytriazine capped polyphenylene ethers and methods of preparation. U.S. patent application Ser. No. 07/534,573, filed Jun. 7, 1990, now U.S. Pat. No. 5,010,144 describes advantageous polyphenylene ether/polyester copolymers and polyphenylene ether/polyamide copolymers obtained from phosphatetriazine capped polyphenylene ethers. U.S. patent application Ser. No. 07/534,595, filed Jun. 7, 1990, now abandoned describes phosphatetriazine capped polyphenylene ethers and methods of preparation. These U.S. applications and their corresponding European patent applications, as published, describe materials which are treated by the method of this invention to obtain the products of this invention and each of these U.S. applications and their corresponding European Patent applications are incorporated by reference in total in this application.

As described in the patent applications incorporated by reference herein, chlorocyanurate derivatives have been shown to be highly efficient functionalization agents for polyphenylene ethers. Such materials are made by a reaction that utilizes an alkali metal hydroxide such as sodium hydroxide as a basic reagent, and alkali metal chlorides can be produced as by-products of the capping reaction. After the capping reaction is completed, the solution may be neutralized by addition of carbon dioxide. If neutralization of excess alkali metal hydroxide is employed, other salts, along with alkali metal chlorides can be produced, depending upon the exact stoichiometry employed in the capping reaction. For example, if sodium hydroxide is used as the base and carbon dioxide is added at the end of the capping reaction, sodium carbonate and sodium chloride could be anticipated to be present in the reaction mixture, depending on the exact stoichiometry employed in the reaction.

When ammonium containing materials or tertiary amines are present in capping reactions, excess ammonium ions can be left in the capped polyphenylene ethers produced.

It has now been found that the desirable properties of capped polyphenylene ethers can be improved by assuring a low level, or the absence of, alkali metal ions and ammonium ions in the resultant capped polyphenylene ethers, particularly when the ethers are combined with polyesters, polyamides or mixtures thereof. While the exact mechanism for the advantages obtained is not fully understood, it is believed that alkali metal ions and ammonium ions, and salts thereof, if present will attack polyesters and polyamides combined with the polyphenylene ethers to lower desirable properties and particularly notched Izod impact values thereof. Higher Izod impact values, as can be obtained by the use of the methods and products of this invention, are indicative of an increased robustness of the polymeric products obtained which are useful in a variety of conventional processing and molding steps.

SUMMARY OF THE INVENTION

The present invention provides capped polyphenylene ethers having low alkali metal ion and ammonium ion contents, which ethers are particularly useful in blends with polyesters and polyamides to obtain high ductility and high impact values when impact modifiers are also used.

Methods are provided for removing alkali metal ions and/or ammonium ions from the capped polyphenylene ethers, preferably during the isolation process. Thus, the salts that are residues of the reaction in which the polyphenylene ethers are produced, are removed or reduced.

According to the invention, a method of forming a capped polyphenylene ether with low alkali metal and ammonium salt content is obtained by removing at least some of the residues of the reaction to obtain a level of the ions below about 150 ppm (parts per million) in the resultant capped polyphenylene ether. Preferably, removal of the salts during the isolation process, as in a triazine capped polyphenylene ether, affords a method to remove a substantial portion of the salts. The isolation process may include precipitation of the capped polyphenylene ether by contact with a nonsolvent. When a nonsolvent used is an alcohol, as for example methanol, the preferred procedures include the following.

First, water can be added to a reaction mixture followed by separation of the liquid phases, treatment with a nonsolvent to precipitate the capped polyphenylene ether, collection of triazine capped polyphenylene ethers by filtration or centrifugation, after which the collected material can be washed with additional nonsolvent or with a mixture of nonsolvent for the capped polyphenylene ether and up to 10% water.

In a second procedure, precipitation of the capped polyphenylene ether can be carried out with nonsolvent, followed by collection with a filtration or centrifugation step and washing with additional nonsolvent or with a mixture of nonsolvent for the capped polyphenylene ether and up to 10% water.

In a third procedure, the precipitation and filtration steps of the second procedure are carried out with the polyphenylene ether solid transferred for a re-slurry step with additional nonsolvent, or mixture of nonsolvent and H₂O, followed by again collecting the precipitated polyphenylene ether resin.

A capped polyphenylene ether, in accordance with this invention, has a level of material selected from a group consisting of alkali metal ions and ammonium ions no higher than about 150 ppm. The capped polyphenylene ether with the low level of alkali metal ions and ammonium ions, as described, is preferably blended with either polyesters or polyamides, or mixtures thereof, to obtain high ductility and when impact modifiers are used, high impact values. Conventional polyesters and polyamides can be blended in conventional manners with the polyphenylene ethers treated to have low alkali metal ion and ammonium ion contents. The term blend, as used in this application, is any physical combination of components which may or may not have a chemical interaction.

It should be understood that the term "low level or level no higher than about 150 ppm" as used in this application, includes having 0 or no alkali metal ions and/or ammonium ions present, as would be the case, for example, when ammonium salts or tertiary amines are not used in the reaction to prepare the capped polyphenylene ethers or, conversely, alkali metals may not be used. Values no higher than 150 ppm can also be obtained at 0 ppm by complete removal. Similarly, when referring to alkali metal ions and ammonium ions, this includes the salt or combined forms. Such ions are normally the residues of the reaction mixtures in which the polyphenylene ethers are capped.

It is a feature of this invention that the low alkali metal ion and ammonium ion values in the capped polyphenylene ethers of this invention are important to give high notched Izod impact strength values when admixed with polyesters, polyamides or combinations thereof in blends having additional polymeric impact modifiers. The low alkali metal ion and low ammonium ion values below about 150 ppm each also are useful to increase ductility of capped polyphenylene ether blends with polyesters and polyamides. Materials suitable as molding compositions for automobile bodies, fenders, door panels, hoods, as well as other molded materials, can be formed from the improved compositions of this invention. Notched Izod impact values of over 10 ft. lbs./inch (ASTM procedure D256) can usually be obtained.

DESCRIPTION OF PREFERRED EMBODIMENTS

Epoxytriazine capped polyphenylene ethers can be obtained as set forth in U.S. patent application Ser. No. 07/351,905, filed May 15, 1989 now U.S. Pat. No. 5,096,979 which is incorporated by reference herein as set forth above. Similarly, blends of capped polyphenylene ethers can be prepared in accordance with U.S. patent application Ser. No. 07/351,903, filed May 15, 1989, now U.S. Pat. No. 5,089,566 which is incorporated by reference herein as set forth above.

The capped polyphenylene ether compositions are preferably epoxytriazine-capped materials which comprise polymer molecules having end groups of the formula

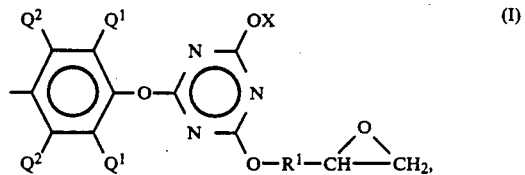

wherein:

each $Q^1$ is independently halogen, primary or secondary lower alkyl (i.e., alkyl containing up to 7 carbon atoms), phenyl, haloalkyl, aminoalkyl, hydrocarbonoxy, or halohydrocarbonoxy, wherein at least two carbon atoms separate the halogen and oxygen atoms;

each $Q^2$ is independently hydrogen, halogen, primary or secondary lower alkyl, phenyl, haloalkyl, hydrocarbonoxy or halohydrocarbonoxy as defined for $Q^1$;

X is an alkyl, cycloalkyl or aromatic radical or

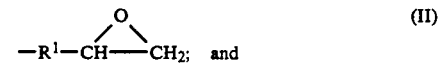

$R^1$ is a divalent aliphatic, alicyclic, heterocyclic or unsubstituted or substituted aromatic hydrocarbon radical.

These compositions are prepared so as to have alkali metal ions and ammonium ions at a level no higher than 150 ppm and preferably about 20 ppm or less. This range includes the complete absence of such ions.

Other capped polyphenylene ether compositions prepared using chlorotriazines include but are not limited to phosphatetriazine capped polyphenylene ethers which can be obtained as set forth in U.S. patent application Ser. No. 07/534,595, filed Jun. 7, 1990, which is incorporated by reference herein. Similarly, blends of phosphatetriazine capped polyphenylene ethers can be prepared in accordance with U.S. patent application Ser. No. 07/534,573, filed Jun. 7, 1990, which is incorporated by reference herein.

The compositions of this invention may be prepared as described hereinafter from the polyphenylene ethers known in the art. The latter encompass numerous variations and modifications all of which are applicable to the present invention, including but not limited to those described hereinafter.

The polyphenylene ethers comprise a plurality of structural units having the formula

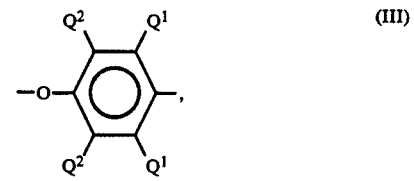

and in each of said units independently, each $Q^1$ and $Q^2$ is as previously defined. Examples of primary lower alkyl groups suitable as $Q^1$ and $Q^2$ are methyl, ethyl, n-propyl, n-butyl, isobutyl, n-amyl, isoamyl, 2-methylbutyl, n-hexyl, 2,3-dimethylbutyl, 2-, 3- or 4-methylpentyl and the corresponding heptyl groups. Examples of secondary lower alkyl groups are isopropyl, sec-butyl and 3-pentyl. Preferably, any alkyl radicals are straight chain rather than branched. Most often, each $Q^1$ is alkyl or phenyl, especially $C_{1-4}$ alkyl, and each $Q^2$ is hydrogen. Suitable polyphenylene ethers are disclosed in a large number of patents.

Both homopolymer and copolymer polyphenylene ethers are included. Suitable homopolymers are those containing, for example, 2,6-dimethyl-1,4-phenylene ether units. Suitable copolymers include random copolymers containing such units in combination with (for example) 2,3,6-trimethyl-1,4-phenylene ether units. Many suitable random copolymers, as well as homopolymers, are disclosed in the patent literature.

Also included are polyphenylene ethers containing moieties which modify properties such as molecular weight, melt viscosity and/or impact strength. Such polymers are described in the patent literature and may be prepared by grafting onto the polyphenylene ether in known manner such vinyl monomers as acrylonitrile and vinylaromatic compounds (e.g., styrene), or such polymers as polystyrenes and elastomers. The product typically contains both grafted and ungrafted moieties. Other suitable polymers are the coupled polyphenylene ethers in which the coupling agent is reacted in known manner with the hydroxy groups of two polyphenylene ether chains to produce a higher molecular weight polymer containing the reaction product of the hydroxy groups and the coupling agent, provided substantial proportions of free hydroxy groups remain present. Illustrative coupling agents are low molecular weight polycarbonates, quinones, heterocycles and formals.

The polyphenylene ether generally has a number average molecular weight within the range of about 3,000–40,000 and a weight average molecular weight within the range of about 20,000–80,000, as determined by gel permeation chromatography. Its intrinsic viscosity is most often in the range of about 0.15–0.6 dl./g., as measured in chloroform at 25° C.

The polyphenylene ethers are typically prepared by the oxidative coupling of at least one corresponding monohydroxyaromatic compound. Particularly useful and readily available monohydroxyaromatic compounds are 2,6-xylenol (wherein each $Q^1$ is methyl and each $Q^2$ is hydrogen), whereupon the polymer may be characterized as a poly(2,6-dimethyl-1,4-phenylene ether), and 2,3,6-trimethylphenol (wherein each $Q^1$ and one $Q^2$ is methyl and the other $Q^2$ is hydrogen).

A variety of catalyst systems are known for the preparation of polyphenylene ethers by oxidative coupling. There is no particular limitation as to catalyst choice and any of the known catalysts can be used. For the most part, they contain at least one heavy metal compound such as a copper, manganese or cobalt compound, usually in combination with various other materials.

A first class of preferred catalyst systems consists of those containing a copper compound. Such catalysts are disclosed, for example, in U.S. Pat. Nos. 3,306,874, 3,306,875, 3,914,266 and 4,028,341. They are usually combinations of cuprous or cupric ions, halide (i.e., chloride, bromide or iodide) ions and at least one amine.

Catalyst systems containing manganese compounds constitute a second preferred class. They are generally alkaline systems in which divalent manganese is combined with such anions as halide, alkoxide or phenoxide. Most often, the manganese is present as a complex with one or more complexing and/or chelating agents such as dialkylamines, alkanolamines, alkylenediamines, o-hydroxyaromatic aldehydes, o-hydroxyazo compounds, -hydroxyoximes (monomeric and polymeric), o-hydroxyaryl oximes and β-diketones. Also useful are known cobalt-containing catalyst systems. Suitable manganese and cobalt-containing catalyst systems for polyphenylene ether preparation are known in the art by reason of disclosure in numerous patents and publications.

The polyphenylene ethers which may be employed for the purposes of this invention include those which comprise molecules having at least one of the end groups of the formulas

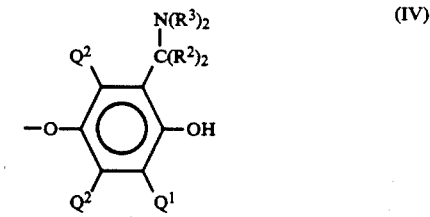

and

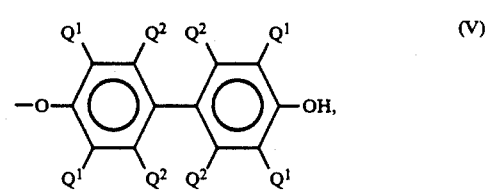

wherein $Q^1$ and $Q^2$ are as previously defined; each $R^2$ is independently hydrogen or alkyl, with the proviso that the total number of carbon atoms in both $R^2$ radicals is 6 or less; and each $R^3$ is independently hydrogen or a $C_{1-6}$ primary alkyl radical. Preferably, each $R^2$ is hydrogen and each $R^3$ is alkyl, especially methyl or n-butyl.

Polymers containing the aminoalkyl-substituted end groups of formula IV are typically obtained by incorporating an appropriate primary or secondary monoamine as one of the constituents of the oxidative coupling reaction mixture, especially when a copper- or manganese-containing catalyst is used. Such amines, especially the dialkylamines and preferably di-n-butylamine and dimethylamine, frequently become chemically bound to the polyphenylene ether, most often by replacing one of the α-hydrogen atoms on one or more $Q^1$ radicals. The principal site of reaction is the $Q^1$ radical adjacent to the hydroxy group on the terminal unit of the polymer chain. During further processing and/or blending, the aminoalkyl-substituted end groups may undergo various reactions, probably involving a quinone methide-type intermediate of the formula

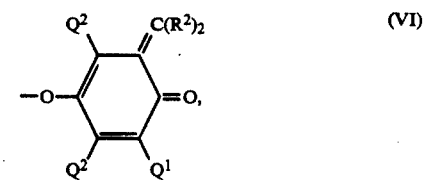

with numerous beneficial effects often including an increase in impact strength and compatibilization with other blend components. Reference is made to U.S. Pat. Nos. 4,054,553, 4,092,294, 4,477,649, 4,477,651 and 4,517,341, the disclosures of which are incorporated by reference herein.

Polymers with 4-hydroxybiphenyl end groups of formula V are often especially useful in the present invention. They are typically obtained from reaction mixtures in which a by-product diphenoquinone of the formula

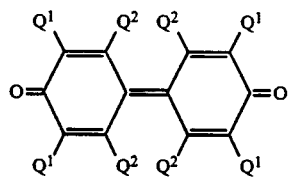 (VII)

is present, especially in a copper-halide-secondary or tertiary amine system. In this regard, the disclosure of U.S. Pat. No. 4,477,649 is again pertinent as are those of U.S. Pat. Nos. 4,234,706 and 4,482,697, which are also incorporated by reference herein. In mixtures of this type, the diphenoquinone is ultimately incorporated into the polymer in substantial proportions, largely as an end group.

In many polyphenylene ethers obtained under the above-described conditions, a substantial proportion of the polymer molecules, typically constituting as much as about 90% by weight of the polymer, contain end groups having one or frequently both of formulas IV and V. It should be understood, however, that other end groups may be present and that the invention in its broadest sense may not be dependent on the molecular structures of the polyphenylene ether end groups. It is, however, required that a substantial proportion of free, non-hydrogen bonded hydroxy groups be present; that is, that a substantial proportion of hydroxy-terminated end groups have structures other than that of formula IV.

The use of polyphenylene ethers containing substantial amounts of unneutralized amino nitrogen may afford compositions with undesirably low impact strengths. The possible reasons for this are explained hereinafter. The amino compounds include, in addition to the aforementioned aminoalkyl end groups, traces of amine (particularly secondary amine) in the catalyst used to form the polyphenylene ether.

The present invention therefore includes the use of polyphenylene ethers in which a substantial proportion of amino compounds has been removed or inactivated. Polymers so treated contain unneutralized amino nitrogen, if any, in amounts no greater than 800 ppm and more preferably in the range of about 100–800 ppm.

A preferred method of inactivation is by extrusion of the polyphenylene ether at a temperature within the range of about 230°–350° C., with vacuum venting. This is preferably achieved in a preliminary extrusion step, by connecting the vent of the extruder to a vacuum pump capable of reducing the pressure to about 200 torr or less. There may also be advantages in employing vacuum venting during extrusion of the composition of this invention.

It is believed that this inactivation method aids in the removal by evaporation of any traces of free amines in the polymer, including amines generated by conversion of aminoalkyl end groups to quinone methides of the type represented by formula VI.

It will be apparent to those skilled in the art from the foregoing that the polyphenylene ethers contemplated for use in the present invention include all those presently known, irrespective of variations in structural units or ancillary chemical features.

The end groups on the epoxytriazine-capped polyphenylene ethers in the compositions of this invention have formula I, in which $Q^1$ and $Q^2$ are as previously defined. X may be an alkyl or cycloalkyl radical, typically lower alkyl and especially primary or secondary lower alkyl; an aromatic radical, typically monocyclic and containing 6–10 carbon atoms and especially an aromatic hydrocarbon radical; or a radical of formula II. In formulas I and II, $R^1$ may be aliphatic, alicyclic, aromatic (including aromatic radicals containing art-recognized substituents) or heterocyclic. It is usually lower alkylene and especially methylene.

Methods for preparing the above-described epoxytriazine-capped polyphenylene ether compositions comprise contacting under reactive conditions, in the presence of a basic reagent, at least one polyphenylene ether with an epoxychlorotriazine of the formula

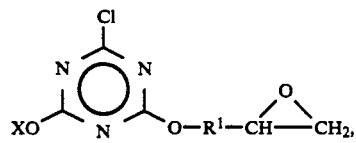 (VIII)

wherein $R^1$ and X are as previously defined.

Typically epoxychlorotriazines of formula VIII include 2-chloro-4,6-diglycidoxy-1,3,5-triazine (hereinafter "DGCC"), 2-chloro-4-methoxy-6-glycidoxy-1,3,5-triazine, 2-chloro-4(n-butoxy)-6-glycidoxy-1,3,5-triazine (hereinafter "BGCC") and 2-chloro-4-(2,4,6-trimethylphenoxy)-6-glycidoxy-1,3,5-triazine (hereinafter "MGCC"). These compounds may also be named as though derived from cyanuric acid and designated diglycidyl chlorocyanurate, methyl glycidyl chlorocyanurate, n-butyl glycidyl chlorocyanurate and 2,4,6-trimethylphenyl glycidyl chlorocyanurate, respectively. They may be prepared, for example, by the reaction of 2,4,6-trichlorotriazine (cyanuric chloride) with glycidol or combinations thereof with methanol, n-butanol or mesitol. Cyanuric chloride and n-butyl dichlorocyanurate are both commercially available.

Intermediates such as DGCC, BGCC and MGCC and the method for their preparation are disclosed and in commonly owned U.S. Pat. No. 4,895,945, which is incorporated by reference herein.

Typical phosphatetriazines include 2-chloro-4(2-diethylphosphatoethoxy)-6-(2,4,6-trimethylphenoxy)-1,3,5-triazine, 2-chloro-4-(2-dibutylphosphatoethoxy)-6-(2,4,6-trimethylphenoxy)-1,3,5-triazine, and 2-chloro-4-(2-dibutylphosphatoethoxy)-6-(2,6-dimethylphenoxy)-1,3,5-triazine. Such intermediates and the method for their preparation are disclosed in copending, commonly owned application Ser. No. 07/534,622, filed Jun. 7, 1990.

Various options are available for the reaction of the polyphenylene ether with the chlorotriazine according to this invention. In one embodiment, the reaction is conducted in solution in a non-polar organic liquid such as toluene, typically at a temperature in the range of about 80°–150° C. and preferably about 100°–125° C. The basic reagent employed in this method should be soluble in the organic liquid and is generally a tertiary amine. Its identity is not otherwise critical, provided it is sufficiently non-volatile to remain in the reaction mixture at the temperatures employed. Pyridine is often preferred.

The amount of chlorotriazine employed in this option is generally in the range of about 1–20% by weight, based on polyphenylene ether. The amount of basic reagent is an effective amount to promote the reaction; in general, about 0.6–1.5, and preferably 1.0–1.1, equivalent thereof per mole of chlorotriazine is adequate.

The epoxytriazine-capped polyphenylene ethers made in solution by the above-described process are generally found to contain rather high proportions (e.g., at least about 0.4% by weight) of chemically combined chlorine, principally covalently bound. It is believed that the covalently bound chlorine is the result of epoxy groups competing with the organic base as a hydrogen chloride acceptor, with the formation of chlorohydrin moieties. This may be followed by condensation of said chlorohydrin moieties with additional triazine units to produce such molecular species as polyphenylene ether-epoxytriazine block copolymers and homopolymeric epoxytriazine oligomers.

A second method of this invention produces triazine-capped polyphenylene ethers with little or no covalently bound chlorine In this method, the reaction is conducted interfacially in a medium comprising water and an organic liquid as previously described. The basic reagent is a water-soluble base, typically an alkali metal hydroxide and preferably sodium hydroxide. It may be added to the mixture of chlorotriazine and polyphenylene ether, or may initially react with the polyphenylene ether to form a salt which is then contacted with the chlorotriazine. There is also employed a phase transfer catalyst. Any of such catalysts which are stable and effective under the prevailing reaction conditions may be used; those skilled in the art will readily perceive which ones are suitable. Particularly preferred are the tetraalkylammonium chlorides, wherein at least two alkyl groups per molecule, typically 2 or 3, contain about 5-20 carbon atoms.

In this embodiment, reaction temperatures in the range of about 20°–100° C. may be employed. The amount of chlorotriazine is frequently lower than in the previously described method, typically in the range of about 1-10% and preferably about 2-6% by weight based on polyphenylene ether, since the reaction of the chlorotriazine with the polyphenylene ether apparently proceeds more nearly to completion. Most often, the ratio of equivalents of base to moles of chlorotriazine is about 0.5-1.5:1, and the weight ratio of phase transfer catalyst to base is about 0.01-5.0:1.

Still another method utilizes an organic liquid and a solid base, typically a solid alkali metal hydroxide or an anion exchange resin in the free base form.

Regardless of which method of preparation is used, the triazine-capped polyphenylene ether may be isolated by conventional methods, typically by precipitation with a non-solvent. Among the non-solvents which may be employed are methanol, 1-propanol, acetone, acetonitrile and mixtures thereof.

When the nonsolvent is an alcohol, and especially methanol, it may undergo base-promoted reaction with the epoxytriazine moieties on the capped polyphenylene ether, usually resulting in a loss of epoxide groups. Either or both of two operations may be employed to suppress this reaction. The first is to neutralize the reaction mixture with any convenient acidic compound; carbon dioxide, in gaseous, liquid or solid form, is often preferred. The second is to remove alcohol from contact with the product as rapidly and completely as possible by conventional means, typically including a subsequent drying step. The nonsolvent used for precipitation of the capped polyphenylene ether can be any nonreactive nonsolvent, including aliphatic hydrocarbons such as heptane, hexane and the like.

The following polyphenylene ethers are among those which can be employed in this invention:

PPE—a poly(2,6-dimethyl-1,4-phenylene ether) having an intrinsic viscosity in chloroform at 25° C. of 0.40 dl./g.

VV—PPE which had been extruded on a twin screw extruder within the temperature range of about 260°–320° C., with vacuum venting to a maximum pressure of about 20 torr.

LN—a poly(2,6-dimethyl-1,4-phenylene ether) having an intrinsic viscosity of 0.57 dl./g., having a low proportion of nitrogen as a result of preparation with a catalyst containing no primary or secondary amine.

Percentages of epoxytriazine in the capped polymer can be determined from the relative areas of peaks in the nuclear magnetic resonance spectrum attributable to hydrogen atoms in the epoxy and aromatic moieties. Chlorine percentages can be determined by quantitative x-ray fluorescence.

Epoxytriazine-capped polyphenylene ethers of this invention differ from those of prior disclosures in that the alkali metal ion concentration and ammonium ion concentration are kept at a level below 150 ppm, which includes complete absence of such ions, which usually, if present, are present in salt form. In methods that utilize an alkali metal hydroxide, such as sodium hydroxide, as the basic reagent, alkali metal chlorides can be produced as by-products of the capping reaction. If neutralization of excess alkali metal hydroxide is employed, other salts will also be produced, depending upon the exact stoichiometry employed in the capping reaction. For example, if sodium hydroxide is used as the base and carbon dioxide is added at the end of the capping reaction, sodium carbonate and sodium chloride could be anticipated to be present in the reaction mixture, depending upon the exact stoichiometry employed in the reaction. Similarly, if the reaction includes tertiary amines, quaternary ammonium salts may result. It has been found that generally the polyphenylene ether compositions can be prepared as known in the art and then the salts removed during the isolation process of the triazine-capped polyphenylene ether, to remove a substantial portion of the salts formed. For example any of the following procedures can be used.

In a first method, water can be added to the precipitation reaction mixture, followed by separation of the liquid phases, collection of the precipitated triazine-capped polyphenylene ether material by filtration, centrifugation, or settling and decanting steps and washing the collected material with additional nonsolvents such as methanol. Thus, the salt level is reduced.

In a second method, the ether is precipitated with methanol, followed by collection with a filtration, centrifugation, or settling and decanting step and subsequently washing the collected material with additional methanol.

In a third method, the second method is repeated, but the resin is re-slurried with additional methanol, followed by again collecting the precipitated capped polyphenylene ether resin.

All three methods are useful. However, the most preferred methods are the second and third, because of ease of operations. All methods demonstrate significant reductions in alkali metal salt levels, but the second and third options allow more toluene to be removed during isolation. Having low levels of toluene present in a collected wet cake allows for a greater latitude in drying the polyphenylene ether resin. Relatively large amounts of toluene in the wet cake can lead to polyphenylene ether power clumping together during drying.

The following specific examples of preparing the low salt level polyphenylene ethers of this invention are non-limiting and are given for illustrative purpose only in connection with this invention.

EXAMPLE 1

To a well stirred reaction vessel filled with 26,085 lbs of a 40% polyphenylene ether (PPE) solution (10,000 lbs of PPE) along with 1085 lbs of water and 10 lbs of a commercially available methyltrialkylammonium chloride solution, with the temperature maintained at 175° F., is added 53 lbs of sodium hydroxide (as a 11.5% solution in water) with continuous agitation. The mixture is stirred vigorously for 30 minutes. Then 500 lbs of mesityl glycidyl chloro cyanurate (MGCC) is added as a 40% solution in toluene. After vigorous stirring for approximately 30 minutes, the epoxy triazine functionalized PPE resin is isolated as described in each of the methods of Examples 2-4.

EXAMPLE 2

To the triazine capped PPE solution is added approximately 10 percent water (based on toluene present) with stirring. The phases are separated and the epoxy capped PPE solution is added to approximately 2.5 to 3 volumes of methanol as a non-solvent. The liquid and solid phases are separated via a rotary vacuum filter with the solid phase transferred to a reslurry vessel. At this point, the solids (wetcake) contain approximately 50% liquid that is a mixture of toluene, water and methanol. An additional 2.5 to 3 volumes of methanol (the methanol contains between 3-6% H$_2$O) is added to the wetcake material with stirring and the solid and liquid phases separated via centrifugation. The solids are then transferred to a conventional powder drier to remove the remaining solvent. The collected PPE resin has a sodium number of 101 ppm.

EXAMPLE 3

The triazine capped PPE solution is added to approximately 3 volumes of methanol without the additional water added in Example 2 (some water was added to the capping reaction above along with the sodium hydroxide). The liquid and solid phases are separated via a centrifuge. With the wetcake supported on the centrifuge, additional methanol and water are added to wash the collected triazine capped PPE. The solid phase is transferred to a reslurry vessel and approximately 3 volumes of methanol is added. At this stage, relatively low levels (ca. 3 to 10%) water is added with the methanol. The phases are again separated via centrifugation and the solids transferred to a conventional powder drier to remove the remaining solvent. The collected PPE resin has a sodium number of 162 ppm.

EXAMPLE 4

In this example, the same procedure as in Example 2 is followed, except that after precipitation, the solids are collected by a rotary vacuum filter and transferred directly to reslurry tank without being washed after the initial precipitation process. To the reslurry tank containing the collected triazine capped PPE is added 3 volumes of methanol (containing 3-6% H$_2$O) followed by centrifugation. Additional reslurry steps are added without difficulty by simply transferring the collected wetcake to another reslurry vessel and adding additional non-solvents. After the reslurry step or steps, the solids are added to a conventional powder drier to remove the remaining solvents. The collected PPE resin has a sodium number of 97 and with an additional reslurry step the sodium number is reduced to 21 ppm.

All three methods of Examples 2-4 are achievable and can be combined with one another, depending upon the types of equipment that are available or the types of solvent streams that are available.

The low alkali metal salt and ammonium ion capped polyphenylene ethers of this invention can be mixed with polyesters or polyamides in conventional blending steps and proportions to obtain high impact materials. Generally, the polyesters or polyamides are mixed with the capped polyphenylene ethers of this invention in amounts of 20-80% by weight of the polyester, polyamide, or mixtures thereof, to the capped polyphenylene ether, although mixtures outside of these ranges may also be useful and have improved impact strength.

The polyesters, which are preferred, generally comprise structural units of the formula

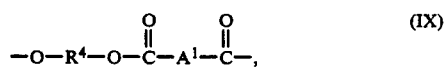

wherein each $R^4$ is independently a divalent aliphatic, alicyclic or aromatic hydrocarbon or polyoxyalkylene radial and $A^1$ is a divalent aromatic radical. They include thermoplastic polyesters illustrated by poly(alkyelene dicarboxylates), elastomeric polyesters, polyarylates, and polyester copolymers such as copolyestercarbonates. Because the principal reaction which occurs with the epoxy groups in the capped polyphenylene ether involves a carboxylic acid group of the polyester, it is highly preferred that said polyester have a relatively high carboxylic end group concentration. Concentrations in the range of about 5-250 microequivalents per gram are generally suitable, with 10-100 microequivalents per gram being preferable, 30-100 being more preferable and 40-80 particularly desirable.

The polyester may include structural units of the formula

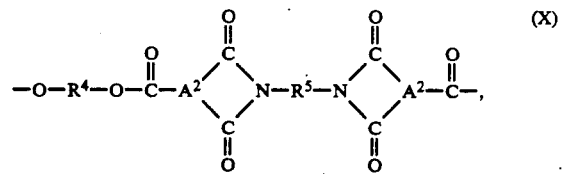

wherein $R^4$ is a previously defined, $R^5$ is a polyoxyalkylene radical and $A^2$ is a trivalent aromatic radical. The $A^1$ radical in formula IX is most often p- or m-phenylene or a mixture thereof, and $A^2$ in formula X is usually derived from trimellitic acid and has the structure

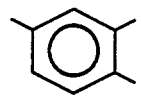

The $R^4$ radical may be, for example, a $C_{2-10}$ alkylene radical, a $C_{6-10}$ alicyclic radical, a $C_{6-20}$ aromatic radical or a polyoxyalkylene radical in which the alkylene groups contain about 2-6 and most often 4 carbon atoms. As previously noted, this class of polyesters includes the poly(alkylene terephthalates) and the polyarylates. Poly(alkylene terephtahalates) are frequently preferred, with poly(ethylene terephthalate) and poly(butylene terephthalate) being most preferred.

The polyester generally has a number average molecular weight in the range of about 20,000–70,000, as determined by intrinsic viscosity (IV) at 30° C. in a mixture of 60% (by weight) phenol and 40% 1,1,2,2-tetrachloroethane.

Either solution or melt blending procedures may be employed for the preparation of the blended compositions of this invention. Typical reaction temperatures are in the range of about 175°–350° C. Thus, relatively high boiling solvents such as o-dichlorobenzene, nitrobenzene or 1,2,4-trichlorobenzene are preferred for solution reactions.

Melt reaction procedures are frequently preferred because of the availability of melt blending equipment in commercial polymer processing facilities. Conventional equipment of this type is suitable, with the use of extrusion equipment generally being convenient and therefore often preferred.

The principal reaction which takes place between the epoxytriazine-capped polyphenylene ether and a polyester generally involves the carboxylic acid end groups of the latter.

The proportions of capped polyphenylene ether and other polymer employed for the preparation of the compositions of this invention are not critical; they may be widely varied to provide compositions having the desired properties. Most often, each polymer is employed in an amount in the range of about 5–95%, preferably about 30–70%, of the composition by weight or 20 to 80% in some cases. Additional impact modifier polymers are preferrably added in amounts of up to about 20% by weight of the total blend.

In addition to polyphenylene ether-polyester copolymer, the compositions of this invention also contain unreacted polyphenylene ether. This will include any polyphenylene ether molecules having only hydrogen bonded end groups (i.e., the aminoalkyl-substituted end groups of formula IV), as well as other polyphenylene ether which is unfunctionalized as a result of incomplete capping or which is functionalized but fails to react with polyester. Said compositions may also contain unreacted polyester. In any event, molded parts produced from said compositions are generally ductile and have higher impact strengths than those produced from simple polyphenylene ether-polyester blends, which are incompatible and often exhibit brittleness or delamination.

The particular polyamide used for this invention is not critical; most are well-known in the art.

Furthermore, the polyamides may be made by any known method, including the polymerization of a monoamino-monocarboxylic acid or a lactam thereof having at least 2 carbon atoms between the amino and carboxylic acid group, of substantially equimolar proportions of a diamine which contains at least 2 carbon atoms between the amino groups and a dicarboxylic acid, or of a monoaminocarboxylic acid or a lactam thereof as defined above, together with substantially equimolar proportions of a diamine and a dicarboxylic acid. The dicarboxylic acid may be used in the form of a functional derivative thereof, for example, an ester or acid chloride. A detailed description of polyamides and polyamide precursor materials is provided in U.S. Pat. No. 4,755,566, issued to J. Yates, III, the entire contents of which are incorporated herein by reference. Other descriptions of suitable polyamides (often referred to as "Nylons") are provided in U.S. Pat. Nos. 4,732,938 (Grant et al.), 4,659,760 (van der Meer), and 4,315,086 (Ueno et al.), each also incorporated herein by reference.

Specific examples of polyamides are polyamide-6, polyamide-6,6, polyamide-11, polyamide 12, polyamide 6,3, polyamide-6,4, polyamide-6,10 and polyamide 6,12, as well as polyamides prepared from terephthalic acid and/or isophthalic acid and trimethylhexamethylenediamine; from adipic acid and m-xylylenediamines; from adipic acid, azelaic acid and 2,2-bis-(p-aminocyclohexyl)propane, and from terephthalic acid and 4,4'-diaminodicyclohexylmethane. Mixtures and/or copolymers of two or more of the foregoing polyamides or prepolymers thereof, respectively, are also within the scope of the present invention.

The polyamide used may also be one or more of those referred to as "toughened nylons", which are often prepared by blending one or more polyamides with one or more polymeric or copolymeric elastomeric toughening agents. Examples of these types of materials are given in U.S. Pat. Nos. 4,174,358; 4,474,927; 4,346,194; 4,251,644; 3,884,882; 4,147,740; all incorporated herein by reference, as well as in a publication by Gallucci et al, "Preparation and Reactions of Epoxy-Modified Polyethylene", J.APPL.POLY.SCI., V.27, PP. 425–437 (1982).

The preferred polyamides for this invention are polyamide-6; 6,6; 11 and 12, with the most preferred being polyamide-6,6.

The weight ratio of polyphenylene ether to polyamide may vary from about 20:80 to about 80:20; however, blends of each polymer employed in amounts of 5–95% and preferably 30–70% of the composition by weight, can also be used. Additional impact modifier polymers are preferably added in amounts of up to about 20% by weight of the total blend.

Additional suitable impact modifiers include various elastomeric copolymers, of which examples are ethylene-propylene-diene polymers (EPDM's), both unfunctionalized and functionalized with (for example) sulfonate or phosphonate groups; carboxylated ethylene-propylene rubbers; polymerized cycloalkenes; and block copolymers of alkenylaromatic compounds such as styrene with polymerizable olefins or dienes, including butadiene, isoprene, chloroprene, ethylene, propylene and butylene. Also included are core-shell polymers, including those containing a poly(alkyl acrylate) core attached to a polystyrene shell via interpenetrating network, and more fully disclosed in U.S. Pat. No. 4,681,915.

The preferred impact modifiers are block (typically diblock, triblock or radial teleblock) copolymers of alkenylaromatic compounds and dienes. Most often, at least one block is derived from styrene and at least one other block from at least one of butadiene and isoprene. Especially preferred are the triblock copolymers with polystyrene end blocks and diene-derived midblocks. It is frequently advantageous to remove (preferably) or decrease the aliphatic unsaturation therein by selective hydrogenation. The weight average molecular weights of the impact modifiers are typically in the range of about 50,000–300,000. Block copolymers of this type are commercially available from Shell Chemical Company under the trademark KRATON, and include KRATON D1101, G1650, G1651, G1652 and G1702.

Examples of the radial teleblock materials mentioned above are those based on styrene and butadiene, with terminal blocks derived from styrene, and a coupling agent selected from epoxidized polybutadiene, SiCl$_4$ or mixtures thereof, as described in a commonly assigned, pending U.S. application Ser. No. 589,871, filed on Sep. 28, 1990, the contents of which are incorporated herein by reference. Illustrative commercial materials of this type are the FINAPRENE products, Grades 401, 411, 414, 416 and 417, available from Fina Oil and Chemical Company.

Furthermore, "tapered" linear block copolymers may also be included in the compositions of the present invention, usually at levels of about 1% by weight to about 20% by weight, based on the weight of the entire composition. These materials are also generally described in the above-referenced application Ser. No. 589,871. Tapered styrene-butadiene-styrene (SBS) linear copolymers are especially preferred, such as FINA-CLEAR 520, also available from Fina Company.

The presence of such polymers as polycarbonates, copolyestercarbonates or polyarylates may have the effect of improving the impact strengths of molded articles under severe molding conditions, such as high molding temperatures and/or prolonged molding cycle times. The same purpose is frequently served by incorporating in the composition at least one other compound containing a plurality of epoxide moieties (hereinafter "polyepoxide"), generally in the amount of about 0.1-3.0 and preferably about 0.25-3.0% of the composition. Illustrative compounds of this type are homopolymers of such compounds as glycidyl acrylate and glycidyl methacrylate, as well as copolymers thereof, preferred comonomers being lower alkyl acrylates, methyl methacrylate, acrylonitrile and styrene. Also useful are epoxy-substituted cyanurates and isocyanurates such as triglycidyl isocyanurate.

The other polyepoxide may be introduced by blending with the other components in a single operation. However, its effectiveness may be maximized by preblending with the polyester, typically by dry mixing followed by extrusion. Such preblending frequently increases the impact strength of the composition. While the reason for the effectiveness of the other polyepoxide is not entirely understood, it is believed to increase molecular weight, melt viscosity and degree of branching of the polyester by reaction with carboxylic acid end groups of a portion of the polyester molecules.

Finally, there may be present conventional ingredients such as fillers, reinforcing agents, drip retardants, plasticizers, flame retardants, pigments, dyes, ultraviolet light stabilizers, heat stabilizers, anti-static agents, crystallization aids, mold release agents and the like, as well as resinous components not previously discussed.

Polyesters and impact modifiers useful in this invention include but are not limited to the following:

PET—various poly(ethylene terephthalates).

PBT—a poly(butylene terephthalate) having a number average molecular weight of about 50,000, as determined by gel permeation chromatography.

PATME—a commercially available elastomeric polyterephthalate from a mixture of tetramethylene glycol, hexamethylene glycol and poly(tetramethylene ether) glycol.

PTME (50,000) and PTME(54,000)—commercially available elastomeric polyterephthalates from mixtures of tetramethylene glycol and poly(tetramethylene ether) glycol, having the designated number average molecular weights and about 20% and 50% by weight, respectively, of poly(tetramethylene ether) glycol units.

PIE—a copolyester prepared from 1,4-butanediol and a 0.91:1 (by weight) mixture of dimethyl terephthalate and the diimide-diacid reaction product of trimellitic acid and a polyoxypropylenediamine having an average molecular weight of about 2000.

SEBS—a commercially available triblock copolymer with polystyrene end blocks having weight average molecular weights of 29,000 and a hydrogenated butadiene midblock having a weight average molecular weight of 116,000.

CS—a core-shell material containing 75% of a cross-linked poly(butyl acrylate) core and 25% of a cross-linked polystyrene shell, prepared in accordance with U.S. Pat. No. 4,684,696.

PO—a polyoctenylene with a cis-trans ratio of 20:80, having a weight average molecular weight of about 55,000.

Resin blends can be prepared by drying, mixing and extruding on a twin-screw extruder, as for example at 400 rpm and 190°-255° c. Extrudates can be quenched in water, pelletized, oven dried and then molded, as for example at 280° C. into test specimens which can be tested for notched Izod impact strength.

In specific examples of blends of the capped polyphenylene ethers of this invention, a capped polyphenylene ether made in accordance with Examples 2-4, is blended with polymers, as shown in the Examples below:

EXAMPLE 5

A blend of 36 parts epoxytriazine functionalized polyphenylene ether resin is admixed with ten parts SEBS polymer and 54 parts PBT. The mixed resin blend is mixed in an extruder as described above (400 rpm at 190°-255° C.) and molded at 280° C. for Izod testing as described above. Varying amounts of sodium salts, as indicated in the table below were added to the 21 ppm sample to make the other samples:

TABLE 1

| Wt % MGCC | ppm Sodium | (ASTM D256) Notched Izod |
|---|---|---|
| 1.77 | 21 | 15.43 ft. lbs./in. |
| 1.77 | 149 | 13.71 ft. lbs./in. |
| 1.77 | 789 | 2.07 ft. lbs./in. |
| 1.77 | 6500 | 2.24 ft. lbs./in. |

As seen in these data, there is a clear distinction in impact strength in samples containing "high" level of salts versus those containing substantially lower levels.

EXAMPLE 6

Table 2 of Example 6 illustrates the value of washing as in Example 2, using the blend proportions described in Example 5. The samples show higher impact values with low sodium levels in the final blend.

TABLE 2

| sodium(ppm)* | wash method used | n. Izod impact in test blend |
|---|---|---|
| 1281 | control | 4.47 ft. lbs./in. |
| 101 | #1 | 15.4 ft. lbs./in. |
| 162 | #2 | 13.6 ft. lbs./in. |

TABLE 2-continued

| sodium(ppm)* | wash method used | n. Izod impact in test blend |
| --- | --- | --- |
| 97 | #3 | 13.7 ft. lbs./in. |

*sodium number determined by Atomic Absorption method

In the re slurry methods described above, relatively low (<10%) levels of water can be added to the methanol at this point. These steps can also be done in combination to maximize the removal of the salts and toluene. For illustrative purposes: sequential reslurry steps could be performed with various levels of water added at each step. In this manner, low levels of toluene can be achieved in the wetcake by having very low levels (<2%) of water present in the methanol followed by reslurry steps that can contain appreciably higher (8%) levels of water in the methanol. For example: a sample isolated after a single re-slurry step as in Example 4 had a sodium number of 149 ppm but with additional re-slurry washing had the sodium number reduced to 21 ppm.

EXAMPLE 7

In Example 7, which shows the Izod impact improvement in molding compositions of this invention, blends of 35% of the material prepared in accordance with Example 2, 10% KRATON G-1651 and 55% VALOX 315 (PBT) (a registered trademarked product of General Electric Co.) are prepared by the addition of appropriate levels of sodium bicarbonate to Sample 6 to form Samples 1 and 2. The remaining Samples 3-7 contain salt levels that were produced directly in the capping reaction using the procedures of Example 2. The results as shown in Table 3 below.

TABLE 3

| No. | % capped (FT-IR) | wt % MGCC (titration) | wt % MGCC (NMR) | n. Izod* (ft. lbs./in.) | sodium (ppm) |
| --- | --- | --- | --- | --- | --- |
| 1 | 100 | — | 1.77 | 2.24 | 6500 |
| 2 | 100 | — | 1.77 | 3.01 | 3250 |
| 3 | 98 | 2.29 | — | 4.47 | 1281 |
| 4 | 100 | 2.55 | 1.86 | 2.07 | 789 |
| 5 | 97 | 1.67 | — | 13.71 | 149 |
| 6 | 100 | 1.71 | 1.77 | 13.63 | 100 |
| 7 | 100 | 1.50 | — | 15.43 | 21 |

*All notched Izod impact strengths given throughout this application are in accordance with ASTM D256.

It is clear from this table that the level of salt contained in the capped polyphenylene ether can play a dramatic role in the impact properties of the final blend.

What is claimed is:

1. A capped polyphenylene ether having a level of materials, selected from the group consisting of alkali metal ions and ammonium ions each no higher than about 150 ppm.

2. An epoxytriazine-capped polyphenylene ether composition comprising polymer molecules having end groups of the formula

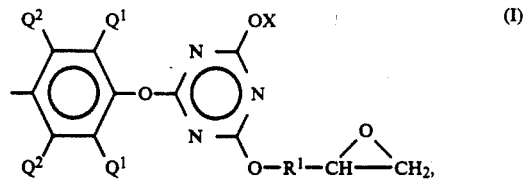

wherein:
each $Q^1$ is independently halogen, primary or secondary lower, alkyl, phenyl, haloalkyl, aminoalkyl, hydrocarbonoxy, or halohydrocarbonoxy, wherein at least two carbon atoms separate the halogen and oxygen atoms;
each $Q^2$ is independently hydrogen, halogen, primary or secondary lower alkyl, phenyl, haloalkyl, hydrocarbonoxy or halohydrocarbonoxy as defined for $Q^1$;
X is an alkyl, cycloalkyl or aromatic radical or

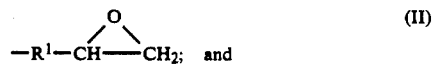

$R^1$ is a divalent, alicyclic, heterocyclic or unsubstituted or substituted aromatic hydrocarbon radical,
said composition having a level of materials, selected from the group consisting of alkali metal ions and ammonium ions, each no higher than about 150 ppm.

3. A composition according to claim 2, wherein the polyphenylene ether comprises a plurality of structural units having the formula

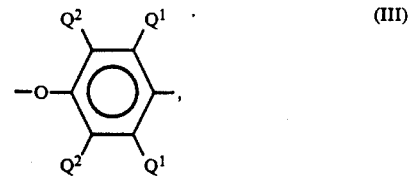

wherein each $Q^1$ is independently halogen, primary or secondary lower alkyl, phenyl, haloalkyl, aminoalkyl, hydrocarbonoxy, or halohydrocarbonoxy, wherein at least two carbon atoms separate the halogen and oxygen atoms; and each $Q^2$ is independently hydrogen, halogen, primary or secondary lower alkyl, phenyl, haloalkyl, hydrocarbonoxy or halohydrocarbonoxy as defined for $Q^1$.

4. A capped polyphenylene ether in accordance with claim 1, designed to be useful in forming high impact blends with polyesters and polyamides, for use as molding compositions.

* * * * *